US012769615B2

(12) United States Patent
Kothival et al.

(10) Patent No.: US 12,769,615 B2
(45) Date of Patent: Oct. 20, 2026

(54) METHODS AND SYSTEMS FOR RESTORING DIRECTORIES CONTAINING MULTI-PART DATA CONTAINERS

(71) Applicant: NetApp, Inc., San Jose, CA (US)

(72) Inventors: Rachita Kothival, San Jose, CA (US); Abhishek Naidu, San Jose, CA (US); Agnel Ravindran, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 19/184,591

(22) Filed: Apr. 21, 2025

(65) Prior Publication Data

US 2026/0244538 A1 Aug. 20, 2026

Related U.S. Application Data

(60) Provisional application No. 63/760,984, filed on Feb. 20, 2025.

(51) Int. Cl.
*G06F 11/14* (2006.01)
*G06F 11/1446* (2026.01)

(52) U.S. Cl.
CPC ...... *G06F 11/1435* (2013.01); *G06F 11/1451* (2013.01); *G06F 11/1464* (2013.01); *G06F 11/1469* (2013.01); *G06F 11/1402* (2013.01); *G06F 11/1446* (2013.01); *G06F 11/1458* (2013.01)

(58) Field of Classification Search
CPC ............. G06F 11/1451; G06F 11/1464; G06F 11/1469
See application file for complete search history.

(56) References Cited

U.S. PATENT DOCUMENTS

| | | | | |
|---|---|---|---|---|
| 11,327,846 | B2 * | 5/2022 | Kumar | G06F 11/1435 |
| 11,392,458 | B2 * | 7/2022 | Chinthekindi | G06F 11/0727 |
| 12,118,390 | B2 * | 10/2024 | Gottipati | G06F 11/1461 |
| 12,572,429 | B2 * | 3/2026 | Dobrean | G06F 11/1451 |
| 2017/0199887 | A1 * | 7/2017 | Fullbright | G06F 11/1446 |
| 2023/0236939 | A1 * | 7/2023 | Mufti | G06F 11/1464 707/675 |
| 2025/0335282 | A1 * | 10/2025 | Tiwary | G06F 11/0769 |
| 2025/0363016 | A1 * | 11/2025 | Dobrean | G06F 11/1451 |

* cited by examiner

*Primary Examiner* — Jonathan D Gibson

(74) *Attorney, Agent, or Firm* — Jaffery Watson Hamilton & DeSanctis LLP

(57) ABSTRACT

Systems and methods for restoring multi-part files and directories in cloud storage environments are described. A catalog inode associated with a multi-part file is restored, containing metadata comprising inode parts corresponding to file parts. The inode parts are iteratively restored based on the catalog inode metadata. Corresponding file parts are then retrieved from cloud storage resources and assembled to reconstruct the multi-part file. The process may involve creating and updating checkpoints, restoring subsets of inode parts, and parallel retrieval of file parts. For directory restoration, the method is applied to multiple catalog inodes within the directory structure. The restoration process may handle flexible volumes and additional directories. Apparatuses implementing these methods include processors and memory storing instructions to perform the restoration steps. The systems and methods enable efficient, granular restoration of complex file structures in distributed cloud environments while maintaining data integrity and providing robust recovery capabilities.

20 Claims, 10 Drawing Sheets

250

File A 201

300

700

METHODS AND SYSTEMS FOR RESTORING DIRECTORIES CONTAINING MULTI-PART DATA CONTAINERS

CROSS-REFERENCE TO RELATED APPLICATIONS

The present application claims the benefit and priority of U.S. Provisional Application No. 63/760,984, filed Feb. 20, 2025, and titled Cloud Granular Data Distribution (GDD) Restoration of Multi-Part Inodes for Multi-Part Files. A Non-Provisional Application is filed the same date herewith, titled Methods and Systems for Restoring Multi-Part Data Containers, Ser. No. 19/184,517. The contents of each of these is incorporated by reference in their entirety herein.

TECHNICAL FIELD

The present disclosure relates generally to data storage and management systems, and more particularly to techniques for restoring multi-part files in distributed cloud storage environments. The techniques described herein may be applicable to cloud-based storage systems, distributed file systems, and other networked storage architectures where data may be dispersed across various storage resources.

BACKGROUND

Cloud storage systems have become increasingly popular for storing and managing large amounts of data. These systems allow organizations to store data across distributed resources, providing scalability, redundancy, and accessibility. As data volumes grow, there is an increasing need for efficient ways to organize and retrieve information stored in the cloud. One approach that has emerged is the use of multi-part files, where large files are split into smaller components or "parts" that can be distributed across storage resources. This allows for more flexible storage allocation and parallel access to different portions of a file.

However, restoring multi-part files from cloud storage presents challenges, as the various parts need to be located, retrieved, and reassembled correctly. Traditional file restoration techniques are often not well-suited for handling multi-part files in distributed cloud environments. They may not account for the dispersed nature of the file parts or provide efficient ways to reconstruct the logical file structure. Additionally, restoring only specific portions of a large multi-part file, rather than the entire file, can be difficult with conventional methods.

There is a need for techniques to restore multi-part files from cloud storage systems that enable efficient, granular restoration of file components while maintaining the logical structure and accessibility of the complete file. Advances in this area have the potential to improve the flexibility, performance, and reliability of cloud-based storage solutions.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to an aspect of the present disclosure, a method for restoring a multi-part file in a cloud storage system is provided. The method includes restoring, by a processor implementing a restoration instance of the cloud storage system in response to receiving a request to restore the multi-part file that comprises a plurality of file parts distributed across the cloud storage system, a catalog inode associated with the multi-part file. The catalog inode includes metadata associated with the plurality of file parts, and the metadata comprises a plurality of inode parts corresponding to individual file parts of the multi-part file. The method further includes restoring, iteratively by the processor based on the metadata of the catalog inode from the cloud storage system, the plurality of inode parts in the restored catalog. The method also includes retrieving, by the processor based on the restored plurality of inode parts, the corresponding individual file parts from their respective storage resources of the cloud storage system. Finally, the method includes assembling, by the processor based on the catalog inode and plurality of inode parts, the retrieved corresponding individual file parts to reconstruct the multi-part file.

According to another aspect of the present disclosure, a method for restoring a directory in a cloud storage system is provided. The method involves receiving a request to restore the directory, which comprises multiple database parts including at least one catalog inode associated with a multi-part file. The catalog inode contains metadata for the file parts, including inode parts corresponding to individual file parts. For each catalog inode, the method includes restoring the catalog inode at a new volume location, iteratively restoring the inode parts based on the catalog inode metadata, retrieving the corresponding file parts from their storage resources, and assembling the file parts to reconstruct the multi-part file.

In a further aspect, an apparatus for restoring a multi-part file in a cloud storage system is described. The apparatus includes a processor and memory storing instructions that, when executed, cause the apparatus to restore a catalog inode associated with the multi-part file in response to a restore request. The catalog inode includes metadata for the file parts, comprising inode parts corresponding to individual file parts. The apparatus iteratively restores the inode parts based on the catalog inode metadata, retrieves the corresponding file parts from their storage resources, and assembles the file parts to reconstruct the multi-part file.

Another aspect of the disclosure describes an apparatus for restoring a directory in a cloud storage system. The apparatus includes a processor and memory with instructions that, when executed, cause the apparatus to receive a request to restore a directory comprising database parts, including at least one catalog inode associated with a multi-part file. The catalog inode contains metadata for the file parts, including inode parts corresponding to individual file parts. For each catalog inode, the apparatus restores the catalog inode at a new volume location, iteratively restores the inode parts, retrieves the corresponding file parts, and assembles the file parts to reconstruct the multi-part file.

The foregoing general description of the illustrative embodiments and the following detailed description thereof are merely exemplary aspects of the teachings of this disclosure and are not restrictive.

BRIEF DESCRIPTION OF FIGURES

The present disclosure is best understood from the following detailed description when read with the accompanying figures.

DETAILED DESCRIPTION

Figure 1:
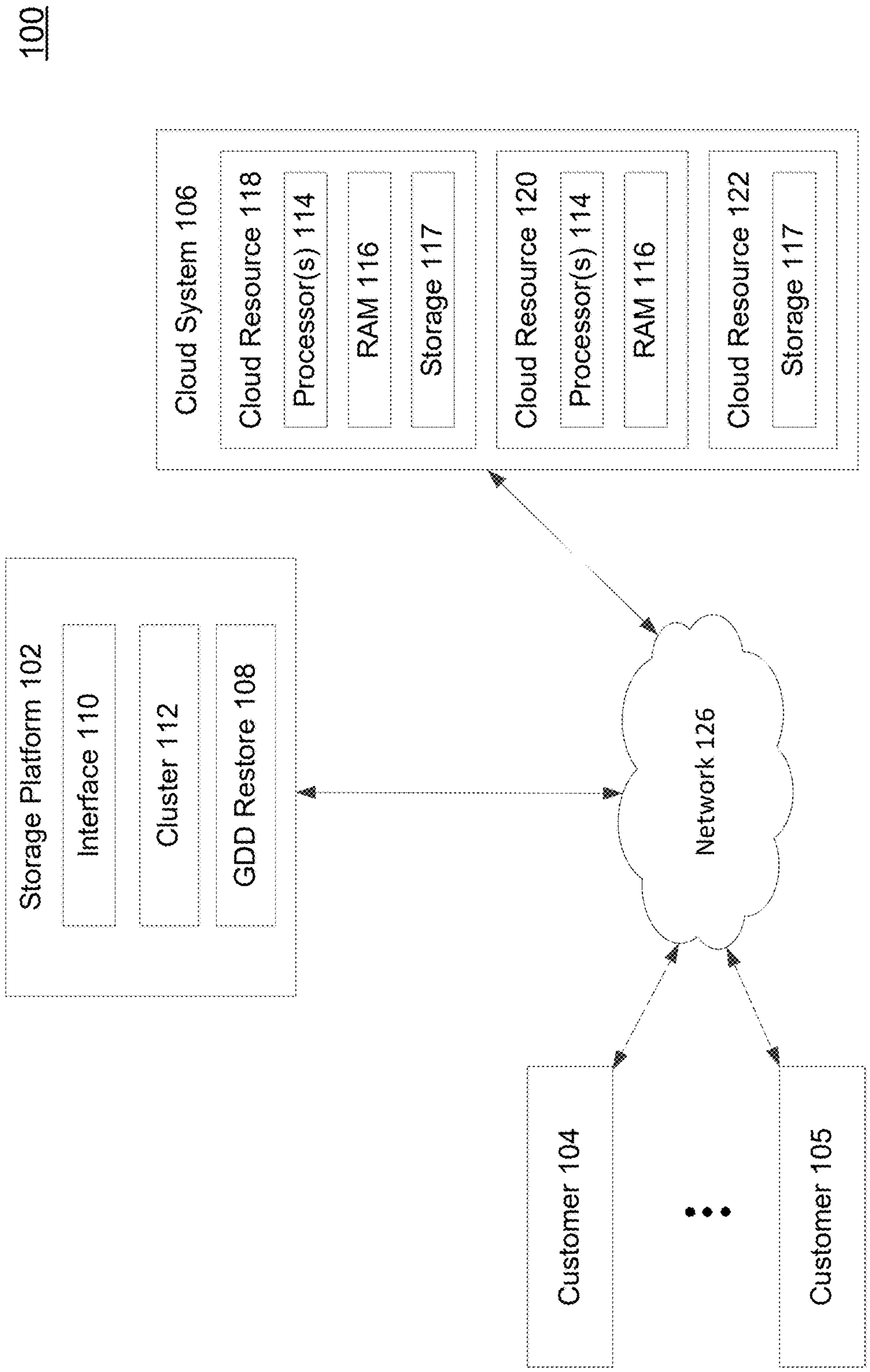
FIG. 1 is a schematic diagram illustrating a cloud computing environment in accordance with one or more example embodiments.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

As a preliminary note, the terms "component," "module," "system," and the like as used herein are intended to refer to a computer-related entity, either software-executing general-purpose processor, hardware, firmware and a combination thereof. For example, a component may be, but is not limited to being, a process running on a hardware processor, a hardware processor, an object, an executable, a thread of execution, a program, and/or a computer. By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Various embodiments include systems, methods, and machine-readable media for handling multi-part metadata for restoring multi-part files in cloud storage systems. The multi-part file restoration process involves a coordinated effort between various components of a cloud storage system, which begins when a restore request is received by a storage platform. A restore module initiates the restoration process, coordinating with the cloud system and its various cloud resources to locate and retrieve the distributed parts of a multi-part file. The term file/files as used herein includes data container/data containers, and/or data object/data objects with structured or unstructured data. Further, the term directory/directories as used herein includes data container/containers that include within them other data container/data containers, and/or data object/data objects with structured or unstructured data (such as other directories and/or files). The restoration process follows a systematic approach. A restore manager module orchestrates the overall process, utilizing a restore orchestrator module and cloud iterator modules to retrieve file parts from cloud storage. The process involves iteratively restoring inode parts of a catalog inode, retrieving corresponding file parts, and assembling them to reconstruct the multi-part file.

Throughout this process, the system maintains checkpoints to track progress and enable recovery in case of interruptions. Aspects of the present disclosure include setting up incore objects, creating checkpoints, restoring catalog elements, and performing batch restore operations on files. This approach allows for efficient and reliable restoration of complex multi-part files in distributed cloud environments.

Further, aspects of the present disclosure provide systems and methods for restoring directories containing multi-part files in a cloud storage environment. The restoration process begins when a request to restore a directory is received by the system. The system includes specialized components for handling directory-specific restoration tasks, working in conjunction with modules that manage individual file restorations. The process involves iteratively restoring catalog inodes associated with multi-part files within the directory. For each catalog inode, the system restores it at a new volume location, then iteratively restores the associated inode parts based on metadata stored in the catalog inode. The system retrieves corresponding file parts from their respective storage resources and assembles them to reconstruct the multi-part files. This process may be repeated for multiple files within the directory. Throughout the restoration, the system maintains checkpoints to track progress and enable recovery in case of interruptions. The method includes steps for setting up necessary objects, creating and updating checkpoints, restoring catalog elements, and performing batch restore operations on files. This approach allows for efficient and reliable restoration of complex directory structures containing multi-part files in distributed cloud environments.

Multi-part file restoration and directory restoration including multi-part files, according to aspects of the present disclosure, offer significant advantages in cloud storage environments. These techniques may enable more efficient use of storage resources by allowing large files to be distributed across multiple storage locations while maintaining a unified logical structure. The ability to restore individual parts of a file or specific files within a directory may reduce network bandwidth usage and processing overhead compared to restoring entire files or directories. This granular approach to restoration may also improve recovery times, especially for large datasets. By implementing checkpointing mechanisms, the system may provide robust recovery capabilities in case of interruptions, enhancing overall system reliability. Aspects of the present disclosure may further improve the operation of computers and networks by optimizing data transfer processes, reducing unnecessary data movement, and enabling more flexible and efficient use of distributed storage resources. This may lead to improved performance, reduced latency, and enhanced scalability of cloud storage systems, allowing them to handle larger volumes of data and more complex file structures with greater efficiency. These and other beneficial aspects will be discussed and discerned below.

FIG. 1 illustrates a cloud provider environment 100 according to some embodiments of the present disclosure. The cloud provider environment 100 may include, among other things, a storage platform 102, one or more customers 104, 105, and a cloud system 106. These aspects of the cloud provider environment 100 may communicate with each other via a network 126. The network 126 may be, for example, the Internet, a local area network, a wide area network, and/or a wireless network (to name a few examples). The network 126 may include a variety of transmission media including cables, optical fibers, wireless routers, firewalls, switches, gateways, and/or other devices to facilitate communications between one or more of the aspects of the environment 100.

Cloud system 106 may be a provider of cloud infrastructure for one or more customers 104, 105 (representing generally any number of customers). Cloud system 106 may provide a variety of cloud computing solutions, such as infrastructure as a service (IaaS), software as a service (SaaS), and/or platform as a service (PaaS) as some examples. For example, cloud system 106 may be a public cloud provider, examples of which include Amazon Web Services™ (AWS™), Amazon FSx™, Microsoft® Azure®, and Google Cloud Platform™. These are by way of illustration. The cloud system 106 may represent a multi-tenant cloud provider that may host a variety of virtualization tools that customers 104, 105 may request to host or otherwise run one or more applications (e.g., via the network 126). Alternatively (or additionally), the cloud system 106 may represent a private cloud provider, such as an enterprise cloud for a given organization.

Cloud system 106, generally, may provide infrastructure including any set of resources used for executing one or more containers, virtual machines, or other hosted virtualization tool(s). Resources may include CPU resources, memory resources, caching resources, storage space resources, communication capacity resources, etc. that a virtualization tool may use for execution of one or more workloads for customers 104, 105. These resources are illustrated in FIG. 1 as cloud resources 118, 120, and 122 of cloud system 106. These may represent any number of cloud resources in any of a variety of combinations. As just one example, the cloud resources 118-122 may be in the form of one or more AWS EC2™ or S3™ instances, or other instance type from a cloud provider. As another example, the cloud resources 118-122 may be in the form of one or more file systems hosted by cloud system 106 which a customer 104, 105 may request for data management for whatever the workload requirements are for a particular client, including for example the backing up and recovery of directories, files (e.g., including multi-part files, etc).

As an example, cloud resource 118 may include a processor 114, RAM 116 and storage 117. Processor 114, which may be one or more processors such as multiple processors. The processor 114 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 114 may also be implemented as a combination of computing devices, e.g., a combination of a DSP and a microprocessor, a plurality of microprocessors, one or more microprocessors in conjunction with a DSP core, or any other such configuration.

The processor 114 is connected to RAM 116 to execute one or more instructions stored in the RAM 116 by the processor 114. The RAM 116 may include a cache memory (e.g., a cache memory of the processor 114) and random access memory (RAM). The processor 114 and the RAM 116 may be connected to storage 117, which provides the non-volatile storage for instructions executed in the RAM 116 by the processor 114, may include magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. The storage 117 of the examples described and illustrated herein are not limited to any particular geographic areas and can be clustered locally and/or remotely via a cloud network, or not clustered in other examples.

The stored instructions may include instructions that, when executed by the processor 114, cause the processor 114 to perform the operations described herein, such as for restoring multi-part files and directories including one or more multi-part files. Instructions may also be referred to as machine executable code. The machine executable code may be for causing a device to perform these operations, for example by causing one or more processors to control or command the device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

As a further example, cloud resource 120 may include only the processor 114 and RAM 116, with the storage 117 located remotely. As yet a further example, cloud resource 122 may include only storage 117, which operates as remote storage for cloud resource instances including a processor 114 and RAM 116 or for other devices connected via the network 126 to the cloud system 106, such as the storage platform 102. For example, a customer 104 (or 105, but referring to 104 for simplicity herein) may run one or more virtualization layers, such as virtual machines and/or containers on one or more cloud resources 118-122 of cloud system 106, via network 126. For example, a container may use a level of system level virtualization, such as by packaging up application code and its dependencies (e.g., system tools, system libraries and/or settings, etc.) so that the hosted application can be executed reliably on one or more computing platforms of the cloud system 106 (as an example). Some examples of software may include, for example, Red Hat® OpenShift®, Docker® containers, chroot, Linux®-

VServer, FreeBSD® Jails, HP-UX® Containers (SRP), VMware ThinApp®, etc. Containers may run on the cloud system 106 on a host operating system directly, or may be run via another layer of virtualization (such as within a virtual machine). Where containers are used, the cloud system 106 may further contain, and/or interact with, one or more orchestrators that perform scheduling within a set of available infrastructure (e.g., determining required infrastructure based upon the needs of what is being executed/requested for execution, mapping of containers to different cloud resources 118-122, making actual requests for infrastructure, and actual allocation of resources).

The environment 100 may further include storage platform 102. Storage platform 102 is illustrated as separate from cloud system 106, though it may be an example of a cloud resource (e.g., cloud resources 118, 120, 122), as storage platform 102 may be hosted and/or managed by a different entity than the cloud system 106 (e.g., a different provider for storage than a public cloud provider), but operate in cooperation with the cloud system 106 to provide storage services to one or more customers 105, 106. The storage platform 102 may alternatively be hosted and/or managed by the same entity as the cloud platform 106 (e.g., be part of cloud platform 106). The storage platform 102 may include an interface 110, a cluster 112, and GDD restore module 108. These may be executed by a processor or multiprocessor (such as one or more of the examples given above with respect to processor 114), RAM (such as one or more of the examples given above with respect to RAM 116) and storage (such as one or more of the examples given above with respect to storage 117). These may include instructions which, when executed by the processor(s) for the storage platform 102, cause the processor to perform the operations described herein with respect to restoring multi-part files, and so on.

For example, while illustrated as separate from cloud system 106, the cluster 112 may, itself, be hosted by the cloud system 106 as a software-defined environment in which the storage platform 102 may make storage decisions according to embodiments of the present disclosure. In other examples, the storage platform 102 may include its own processor(s), memory(ies), and other resources that interface with the cloud system 106 with the instructions. In yet other examples, the cluster 112 may be hosted on a system that is external to both the storage platform 102 and the cloud system 106. The cloud system 106 and storage platform 102 may be jointly owned or owned by separate entities. The cloud system 106 and storage platform 102 may be co-located to improve storage access speed or they may be located in different data centers. The cloud system 106 and the storage platform 102 may work jointly to provide storage options to customers 104, 105 that are utilizing the capabilities of cloud system 106. The cloud system 106 may provide seamless access to the storage platform 102 for ease of use by the customers 104, 105.

According to embodiments of the present disclosure, storage platform 102 may function as a back-end storage service for cloud system 106. That is, storage platform 102 may support cloud system 106 in providing storage as a service (SaaS) to customers, including customers 104, 105. Storage platform 102 may include a storage operating system (OS) that specializes in providing advanced storage functions, such as deduplication, compression, synchronization, replication, snapshot creation/management, disaster recovery, backup and archive, high availability storage, cloning functionality, data tiering, encryption, multi-platform access, etc. For example, the storage OS may be a file system hosted by the cloud system 106 (whether separately as illustrated, or otherwise integral with/implemented with the cloud system 106). In an example, the storage OS may execute within a storage virtual machine, a hyperscaler, or other computing environment. The storage OS may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by a node, a cloud object, etc.). Each storage object may be associated with a unique identifier that uniquely identifies the storage object. The term volume or storage volume as used herein includes is a logical component used by applications, databases, and file systems to store data in a storage system. For example, a volume may be associated with a volume identifier uniquely identifying that volume from other volumes. The storage OS also manages client access to the storage objects.

As an example of logically organizing data, the storage OS may implement a write anywhere file layout for a volume where modified data for a file may be written to any available location. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.). Other representations may be used instead or in addition. The storage OS may allow client devices to access data (e.g., through cloud system 106 in some examples) stored within the storage platform 102 using various types of protocols, such as a Network File System (NFS) protocol, a Server Message Block (SMB) protocol and Common Internet File System (CIFS), and Internet Small Computer Systems Interface (iSCSI), and/or other protocols.

In some examples, customers 104, 105 using cloud system 106 may request to schedule a job (e.g., volume replication, volume backup, rekey, etc.) via cloud system 106. The cloud system 106 may, in turn, pass the job request to storage platform 102 for processing and handling. For example, cloud system 106 may offer different job types to customers 104, 105, including a storage resource available as cloud resource 118/120/122 (where offered/available), which may have limited, if any, functionality as compared to functionality offered by storage platform 102 implementing a storage OS (more generally, one or more storage OS's among one or more nodes, clusters, and/or regions). As another example, the cloud system 106 may specialize in cloud computing resources and storage platform 102 may specialize in cloud storage resources. Alternatively, cloud system 106 may host the storage platform 102 which may, in turn, be managed by a storage OS (such as a storage file system, including for example third party storage OS such as NetApp's ONTAP® system).

Generally, customers 104, 105 that utilize cloud system 106 may have workloads that utilize resources of multiple cloud resources 118/120/122 and/or cluster 112. A workload may refer to a combination of resources (e.g., 118-122), code, and/or services and applications. Workloads could be customer-facing and/or backend processes. Further, workloads may involve a subset of resources within a single cloud system 106 account or span across multiple accounts. For example, a customer 104, 105 workload may be to run a database, or to implement a virtual machine environment, and/or run an application.

The GDD restore module 108, according to embodiments of the present disclosure, may assist in restoring multi-part files as part of volumes, such as flexible volumes, for customers 104, 105 that obtain one or more resources from cloud system 106 which are further managed by a storage OS. The GDD restore module 108 may function as a data recovery and management component to assist in restoring files and data for customers 104, 105 that utilize one or more resources from cloud system 106. The restore module 108 may discover, initiate, and manage restoration processes for OS file systems (e.g., including cloud storage OS file systems). The GDD restore module 108 may also analyze file system configurations, generate plans to restore data to the cloud system 106, and use customized restoration processes on the cloud system 106 for various data types.

Further, the GDD restore module 108 may identify data restoration needs and analyze efficiency possibilities in the cloud system 106, leverage storage and application benefits when restoring databases (e.g., SQL server databases) to a storage OS on the cloud system 106, initiate restoration processes that implement best practices for data integrity, use automated workflows to streamline operations, and continuously monitor and optimize restoration processes to improve performance, reliability, and cost-efficiency.

Moreover, the restore module 108 may leverage the storage OS file system implemented on the cloud system 106 for restoring customer 104/105's data, including structured and unstructured data from various applications and services. As another example, the GDD restore module 108 may analyze customer data sets that are using a different storage type (e.g., different from the storage OS file system type) and determine optimal restoration strategies if the data were to be moved to the storage OS file system implementation. Such analysis may also be performed for various restoration scenarios to aid in planning and executing efficient data recovery operations. Additionally, the GDD restore module 108 may provide multiple service interfaces for managing restoration operations, which may enable flexible and secure data recovery processes.

The GDD restore module 108 may be a software component that is accessible by customers 104, 105 through various interfaces, e.g. a web-based console (illustrated as interface 110 in FIG. 1). The GDD restore module 108 may further provide functionality for interaction with the cloud system 106, operational modes that control access to the cloud resources of the customer during restoration processes, and mechanisms that ensure secure and efficient connectivity between the restore module 108 and the relevant components of the cloud system 106 during data recovery operations.

Figure 2A:
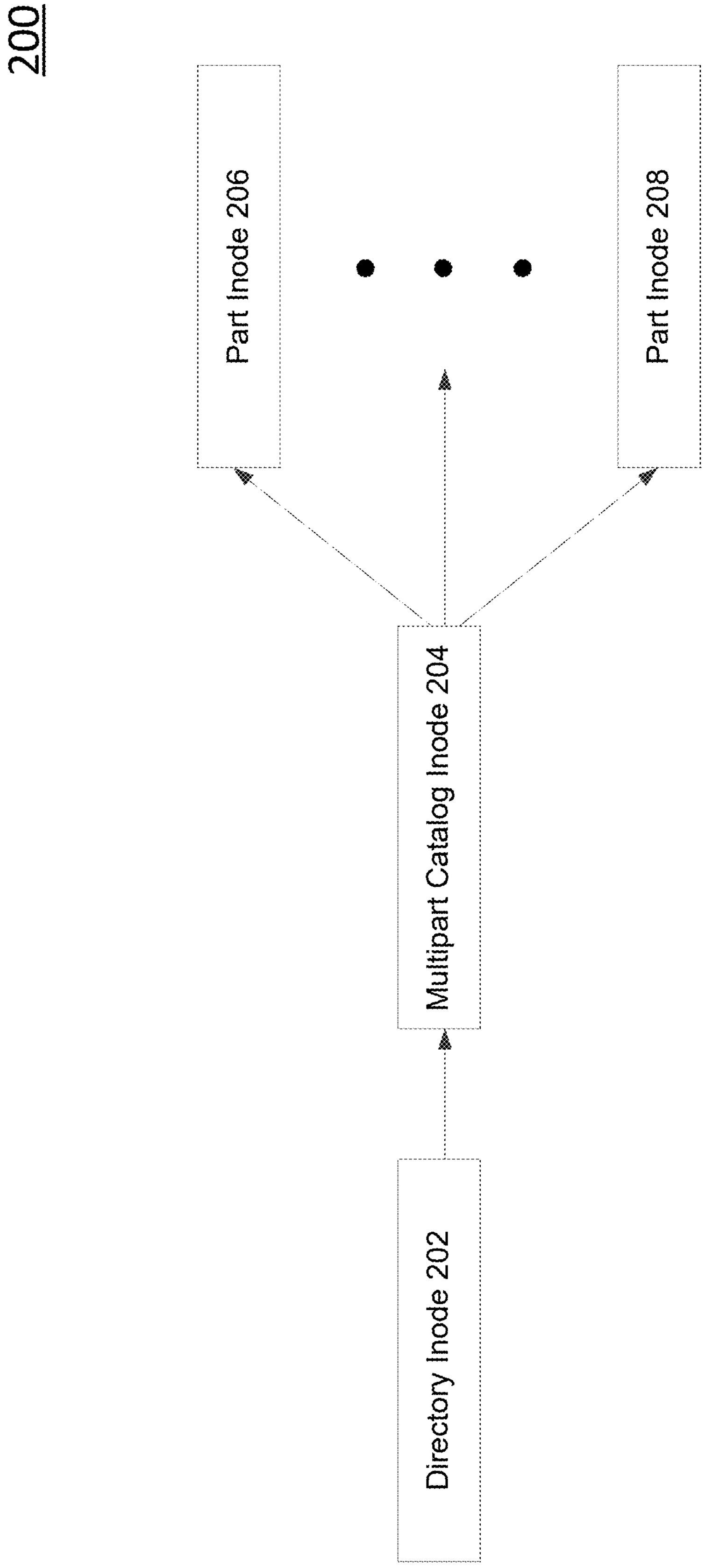
FIG. 2A illustrates an exemplary relationship between entities in a granular data distribution system including one or more multi-part files, in accordance with one or more example embodiments.

FIG. 2A illustrates a block diagram of a multipart file inode configuration 200 that may be implemented within the storage platform 102 or cloud system 106. The multipart file inode configuration 200 includes a directory inode 202, a catalog inode 204, and one or more part inodes 208. As an example, the term inode as used herein means a hierarchical data structure that can be used to store information, such as metadata, about a file. The inode may include, e.g., information regarding ownership of the file, file modification time, access permission for the file, size of the file, file type and references to locations on storage devices of data blocks for the file. In some aspects, the directory inode 202 may represent a higher-level organizational structure within the storage OS file system, providing a logical view of the stored data to clients accessing the system through interfaces such as those provided by the GDD restore module 108.

The catalog inode 204 may serve as an intermediary layer between the directory structure and the actual data storage, allowing for efficient management of multipart files. The catalog inode 204 may function as a central management structure for multiple part inodes, including a first part inode 206 and a second part inode 208 (e.g., 1 to n number of part inodes). In some implementations, the catalog inode 204 may maintain metadata about the multipart file, including information necessary for deduplication, compression, or other advanced storage functions provided by the storage OS. The catalog inode 208 may begin with a single top-level inode named catalog, and may implement a database (e.g., a V+ format, though other formats are possible as well), and the catalog's individual records may refer to the various child inodes (e.g., part inodes 206, 208) that in turn provide the payload for the overall multi-part inode file (e.g., multipart file inode configuration 200).

The catalog inode 204 may thus be a multipart catalog. As such, the catalog inode 204 may contain both a "userheader" area and an expandable collection of individual records. In the catalog inode 204, the userheader conveys some general properties of the collective object while the individual records each convey the identity of a child inode (e.g., part inode 206 and/or 208, etc.) and describe its role within the collective entity. In network attached storage (NAS), it is the multipart catalog inode 204 that a directory (e.g., directory inode 202) points to; thereby, the catalog inode 204 is exposed to the client. Likewise in an S3 bucket, the S3 namespace points directly and exclusively to the multipart catalog inode 204 as its target; the child inodes (e.g., part inodes 206-208 etc.) are accessed subsequently.

The part inodes 206 and 208 may contain more specific information about the location and attributes of the actual data blocks. The first part inode 206 and second part inode 208 may correspond to different portions of a single logical file, potentially distributed across various storage resources such as cloud resources 118, 120, and 122. This structure may enable the storage OS to implement advanced features like the write anywhere file layout, where modified data for a file may be written to any available location. This multipart structure may facilitate efficient data restoration processes managed by the GDD restore module 108, allowing for granular recovery of file parts.

Figure 2B:
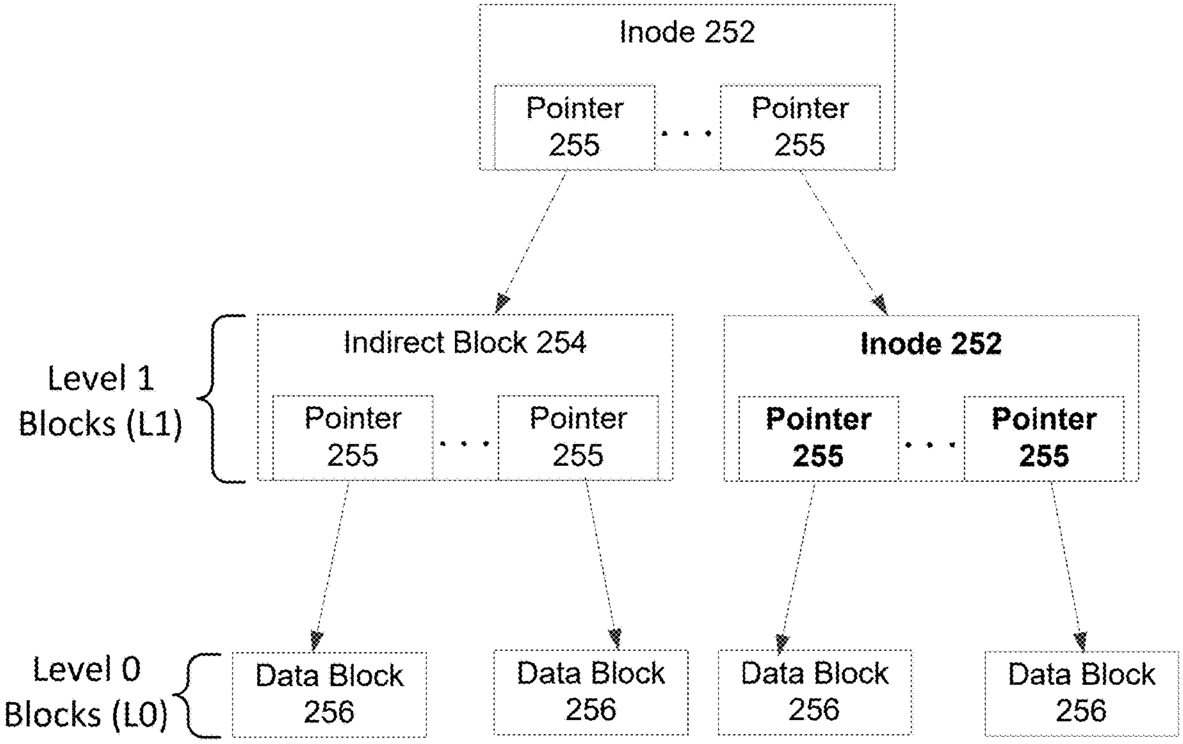
FIG. 2B illustrates an exemplary buffer tree, in accordance with one or more example embodiments.

FIG. 2B is an example of an inode buffer tree of a data container (File A 201) as an internal representation of blocks for the data container (e.g., File A 201) loaded into a buffer cache (e.g., of a storage system) and maintained by a file system. A root (top-level) inode 252, such as an embedded inode, references indirect blocks 254 (e.g., Level 1). The indirect blocks (and inode) contain pointers 255 that ultimately reference data blocks 256 used to store the actual data of file A 201. That is, the data of file A 201 are contained in data blocks and the locations of these blocks are stored in the indirect blocks of the file. Each Level 1 indirect block 254 may contain pointers to a plurality of data blocks. Each L1 block has a fixed span: a fixed number of entries, each pointing to another block in the tree.

Figure 3:
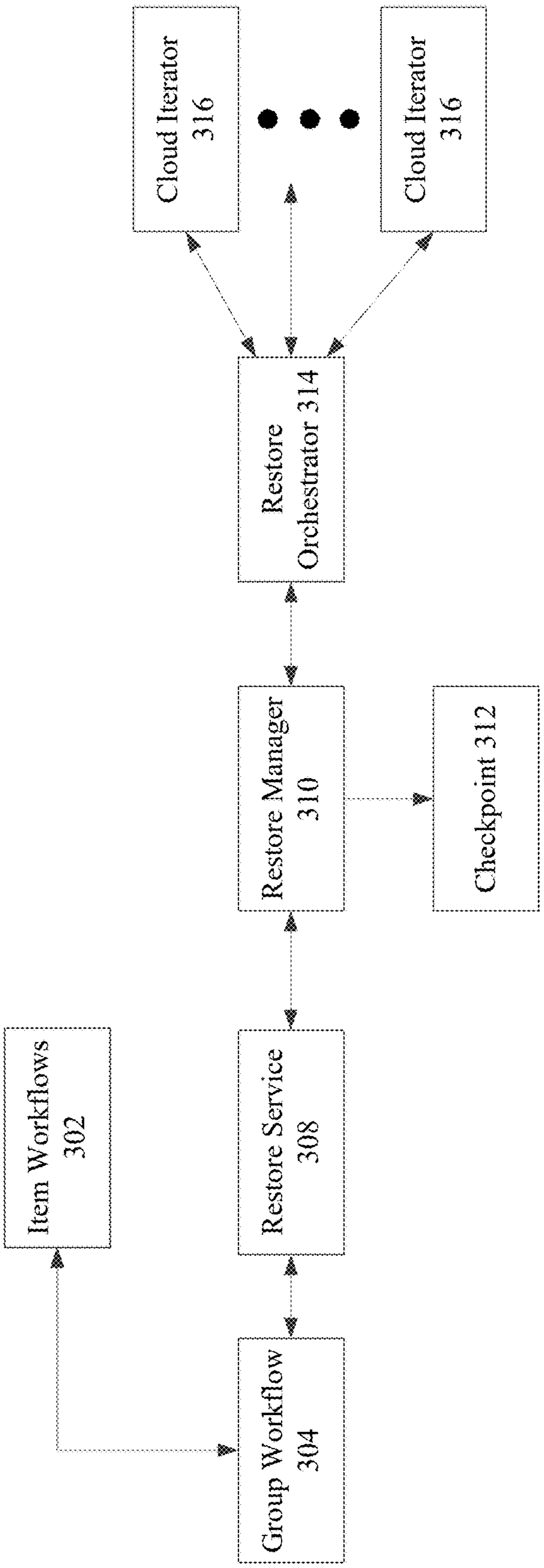
FIG. 3 is a schematic diagram illustrating relationships between cloud computing elements for managing multi-part file restoration processes, in accordance with one or more example embodiments.

FIG. 3 illustrates a block diagram of a restoration system 300 for managing file restoration operations in the cloud provider environment 100. In some cases, the components of the restoration system 300 may be implemented by one or more components of the cloud system 106. For example, the restore manager module 310 may be executed by the processor 114 of the first cloud resource 118, while the cloud iterator modules 316 may be distributed across multiple cloud resources.

The restoration system 300 may include an item workflows 302 and a group workflow 304 that coordinate the overall restoration process. The item workflows 302 may interface with the group workflow 304. The group workflow 304 may interface with a restore service module 308, which may communicate with a restore manager module 310. The restore manager module 310 may connect to a checkpoint module 312 that maintains restoration progress information. The restore manager module 310 may also interface with a restore orchestrator module 314, which may manage multiple cloud iterator modules 316. The cloud iterator modules 316 may handle the retrieval of file inode parts from cloud storage locations, such as the first cloud resource 118, the second cloud resource 120, and the third cloud resource 122.

The item workflows 302 may include, for example, different item workflow functions such as the restoration of regular files (e.g., non-multi-part files), catalog restoration, restoration of access control lists (ACLs), and restoration of labels (e.g., used to save non-standard attributes of a data structure such as a file; standard attributes include name, create time, modify time, size, etc., and exemplary non-standard attributes include granular access rules and other application-specific attributes). The item workflows 302 may further include one or more scanners, such as cloud-to-cloud scanners, that function to scan for the restoration of part inodes. The group workflow 304 may initiate the restoration process by sending a request to the restore service module 308. The restore service module 308 may then communicate with the restore manager module 310 to begin the actual restoration operations.

For example, when there is a multi-part file (or directory including one or more multi-part files) to restore, the group workflow 304 may create an instance of the restore service 308. As part of that creation, or thereafter, the group workflow 304 may pass an array of source, destination pairs to the restore service 308. The restore service 308, in turn, may create an instance of the restore manager 310 (e.g., an example of GDD restore module 108 of FIG. 1). Once instantiated, the restore manager 310 may create and write an initial checkpoint 312 and then return to the group workflow module 304. The group workflow 304 may then pause as item workflow module 302 completes several item workflows including restoring a catalog inode's ACLs, streams, and labels (and may do so for all catalog inodes serially or in parallel, or one at a time). Once done, the restore manager 310 may update one or more checkpoints with a flag (or flags) indicating that the ACLs, streams, and labels have been restored.

Thereafter, the restore manager 310 may query the restore orchestrator 314 for a batch of part inode cloud filehandles corresponding to one or more part inodes 206, 208 (per FIG. 2's illustrated example). The batch size may correspond to the maximum single-file restore batch size of the system (e.g., 200 part inodes as just one example). Where the number of part inodes is smaller than the batch size, then this operation may include querying for all of the part inode cloud filehandles for all of the part inodes. Once obtained, the restore orchestrator 314 returns the batch of part inode cloud filehandles to the restore manage 310. The restore manager 310, with this information, proceeds with creating part inodes for every cloud part inode returned by the restore orchestrator 310 and ties it with the catalog inode.

After the restore manager 310 has created the part inodes that were returned by the restore orchestrator 314, the restore manager 310 updates the checkpoint 312 with the part inode mappings. The restore manager 310 then returns to the group workflow 304 after checkpointing completes and the group workflow 304 again pauses as the item workflow 302 triggers a restore scanner to restore the part inodes of the current batch, based on the creation of the part inodes by the restore manager 310. The group workflow 304 resumes after the item workflows 302 have completed. The restore manager 310 may then clear the part inode mappings in the checkpoint and update the catalog inode iterator cooke and index in the checkpoint, in order to prepare the system for the next batch of part inode cloud filehandles. The restore manager 310 may then query the restore orchestrator 314 for the next batch of cloud filehandles and repeated the actions discussed above, beginning with creating part inodes for every cloud part inode of the current batch.

Once there are no more part inodes to be restored, the restore manager 310 sets up the catalog inodes user headers and enqueues, for example, rectification records. The restore manager 310 may then checkpoint this state of the system, and cleanup may then occur.

In some cases, the restore manager module 310 may update the modification time (mtime) and change time (ctime) of catalog inodes, such as the catalog inode 204, after restoring all associated part inodes, such as the first part inode 206 and the second part inode 208. This may ensure that the restored files maintain accurate timestamp information. The restore orchestrator module 314 may retrieve part inodes in batches. In some implementations, these batches may include up to 2048 part inodes. This batch processing approach may allow for efficient retrieval and restoration of large multipart files. The cloud iterator modules 316 may be responsible for scanning and retrieving file parts from various cloud storage locations. In some cases, a cloud iterator module 316 may resume scanning from a saved cookie position. This feature may allow for efficient resumption of restoration operations in case of interruptions or when processing large datasets. The checkpoint module 312 may implement multilevel checkpointing with separate sections for catalog inodes and part inodes. This approach may allow for granular tracking of restoration progress and efficient recovery in case of failures or interruptions during the restoration process.

Figure 4:
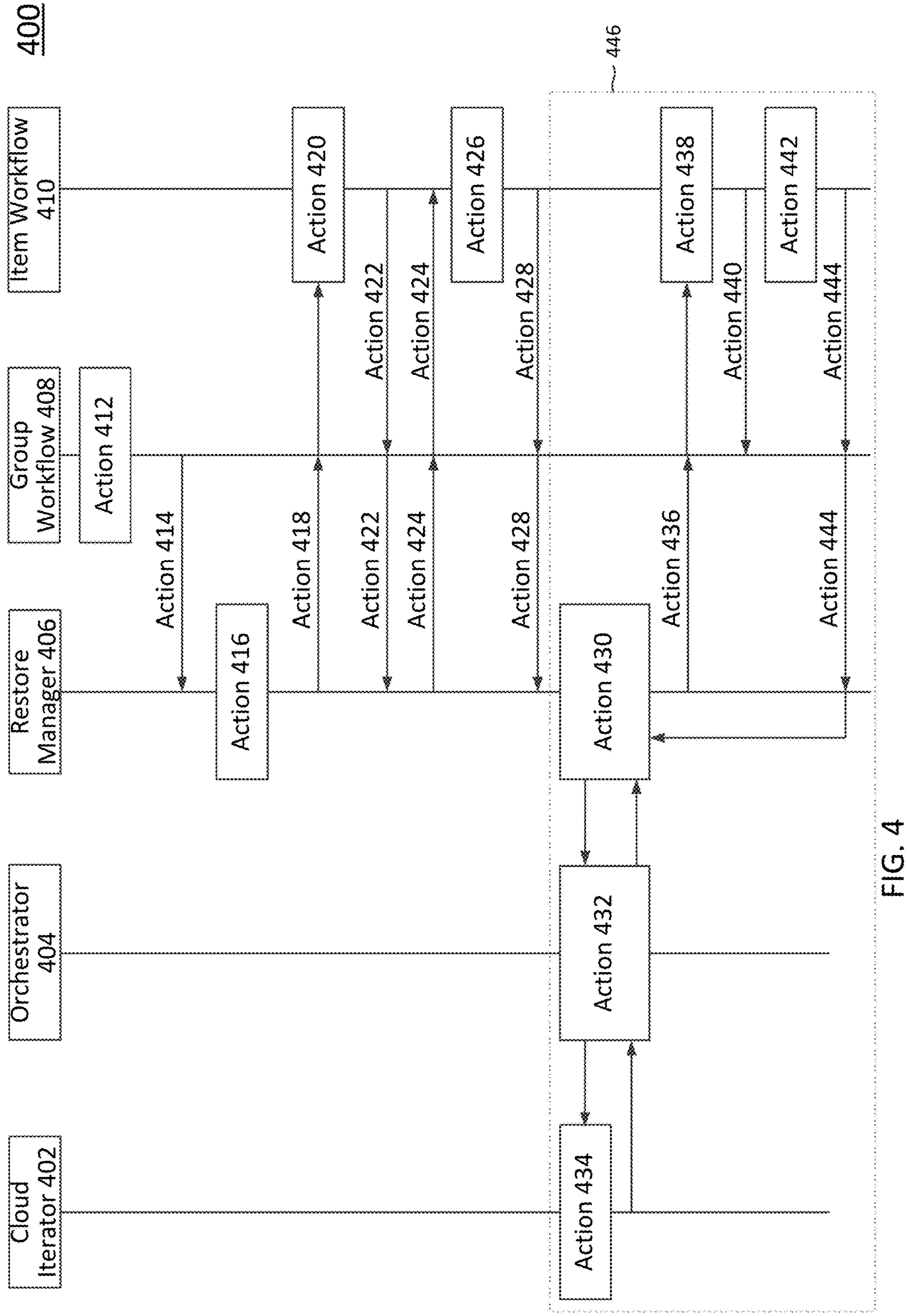
FIG. 4 illustrates a flow diagram of a process for performing multi-part file restoration procedures in accordance with one or more example embodiments.

FIG. 4 illustrates a sequence diagram 400 depicting the interactions between various components during a restoration process in the cloud provider environment 100. The sequence diagram 400 includes a cloud iterator 402, an orchestrator 404, a restore manager 406, a group workflow 408, and an item workflow 410. These components may work together to restore multi-part files and directories in the cloud storage system. Each may correspond to components discussed above with respect to FIGS. 1-3. There are generally two phases-a catalog phase which includes actions 412-428, and a part inode phase which includes actions 430-444.

The restoration process may begin when the group workflow 408 initiates an action 412. This action may involve receiving a request to restore a multi-part file or a directory containing multi-part files. For example, the group workflow 408 may read file information from the cloud. The group workflow 408 may then mark multipart files in the file-restore list as one or more catalog inodes. As a further part of action 412, the group workflow 408 may create all files on the destination. The group workflow 408 may also populate a metafile file group file-restore-user-section and a file group file restore section from a file restore list (e.g., a user specified file list). Finally, as part of action 412 the group workflow 408 may start the restore manager 406.

In response, the group workflow 408 sends at action 414 to the restore manager 406 a list of catalog inodes (e.g., multipart file lists). At action 416, the restore manager 406 receives the list of catalog inodes and inputs the first multipart entry in a multilevel checkpoint file to read multilevel checkpoint information. The resource manager 406 also populates a multilevel checkpoint metafile with all catalog inodes sorted on an index. The resource manager also starts a transfer catalog inode phase in a checkpoint common data mark.

At action 418, the resource manager sends the inode list (which includes catalog inodes and regular files) to the group workflow 408, which passes the list on to the item workflow 410. At action 420, the item workflow transfer starts at the item workflow 410. The item workflow 410 creates a sub-batch based on the same index sorted as part of action 416. For regular files, the item workflow 410 performs inode setup and data transfer of the inode information. For catalog inodes, further as part of action 416, the item workflow 410 transfers inode labels, ACLs, and streams (setup inode) and marks the header dirty. As each sub-batch finishes, the item workflow marks the metafile to indicate that the sub-batch has completed.

At action 422, the item workflow 410 returns a transfer status to the group workflow 408, which in turn passes the transfer status on to the restore manager 406.

In response, at action 424 the restore manager 406 sends an instruction to the group workflow 408, which is passed on to the item workflow 410, to start the conclude phase for the item workflow. This includes unreferencing regular files. The process 400 then returns, at action 428, to the restore manager 406.

At action 430, the part inode transfer phase (marked by boundary 446 in FIG. 4) begins. This includes the restore manager 406 marking the catalog inode phase completed. If the orchestrator 404 is not started already, then action 430 also includes the restore manager 408 starting the orchestrator 404. Further, the restore manager 406 scans the current catalog inode (which contains a catalog of part inode mappings) in batches unless it is already at the end of file. The batches may be, for example, in increments of 256 entries as just one example. Once the whole batch is scanned, the restore manager 406 sends the scanned batch of part inode mappings to the group workflow 408 as action 436, where the group workflow 408 in turn passes on the batch of part inode mappings to the item workflow 410 (e.g., in response to the group workflow 408 starting the item workflow 410 again upon receipt of the batch).

At action 438, the item workflow 410 starts transfer and creates a sub-batch based on the index. The item workflow 410 further starts transfer of the information for each part inode of the sub-batch. This may be performed, for example, by one or more cloud iterators 316 as illustrated in FIG. 3. As each sub-batch completes, the item workflow 410 marks the metafile accordingly.

At action 440, a transfer status is provided to the group workflow 408, which in turn provides instruction for the item workflow 410 to begin a conclude phase for the sub-batch at action 442. This includes unreferencing regular files and perform cleanup on the volume group file restore section in the metafile. At action 444, the transfer status is returned to the group workflow 408, which in turn provides that update to the restore manager 406 so that the process of actions 430-444 may continue until end of file has been reached.

Figure 5:
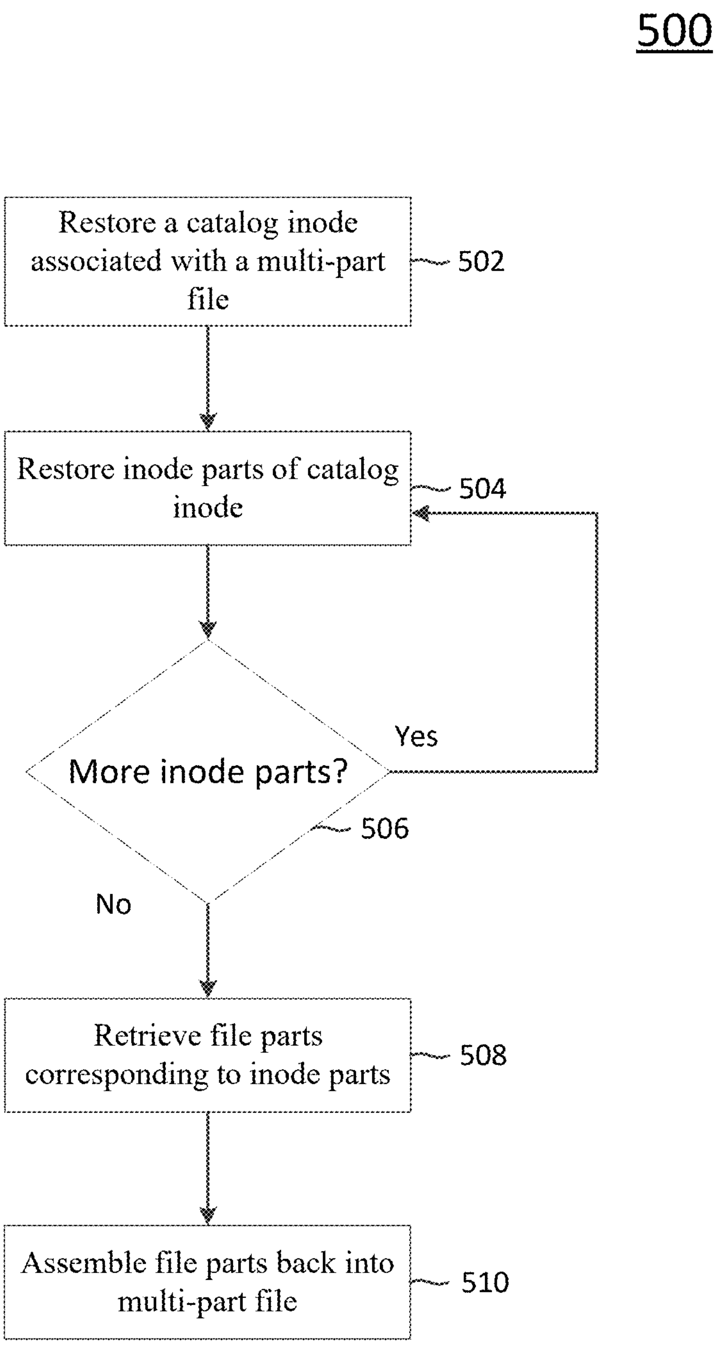
FIG. 5 illustrates a method for performing multi-part file restoration in accordance with one or more example embodiments.

FIG. 5 illustrates a method 500 for implementing for performing multi-part file restoration in accordance with one or more example embodiments. The method 500 may be implemented by one or more processors executing computer-readable instructions (e.g., from one or more computer-readable media) to perform the functions described herein, e.g. by one or more cloud resources illustrated by FIGS. 1-4. It is understood that additional steps can be provided before, during, and after the steps of the method 500, and that some of the steps described can be replaced or eliminated for other embodiments of the method 500.

At block 502, a catalog inode associated with a multi-part file may be restored. In some cases, the catalog inode may be restored to a new volume location within the cloud system 106. The catalog inode may include metadata associated with a plurality of file parts, where the metadata may comprise a plurality of inode parts corresponding to individual file parts of the multi-part file.

After restoring the catalog inode, the method 500 may proceed to a block 504, where the restore module 108 may create a checkpoint for the catalog inode. This checkpoint may be used to track the progress of the restoration process and may allow for efficient resumption of the process in case of interruptions.

At block 506, inode parts of the catalog inode are restored. In some cases, the plurality of inode parts may comprise a first subset and a second subset. The restore module 108 may initially restore only the first subset of the plurality of inode parts.

At a decision block 508, the method 500 may determine if there are more inode parts to restore. If there are more inode parts (Yes branch), the method 500 may return to the block 506 to continue restoring inode parts. If there are no more inode parts to restore (No branch), the method 500 may proceed to a block 510.

At the block 510, the restore module 108 may retrieve file parts corresponding to the restored inode parts. In some cases, this may involve retrieving a third subset of corresponding individual file parts corresponding to the first subset of the plurality of inode parts. The retrieving of the third subset of corresponding individual file parts may be performed as a parallel process, potentially utilizing multiple cloud iterator modules 316 to improve efficiency.

The method 500 then moves to block 512, where the retrieved file parts may be assembled back into the multi-part file. In some cases, this may involve assembling the retrieved third subset of corresponding individual file parts to reconstruct a first portion of the multi-part file. After assembling the first portion of the multi-part file, the restore module 108 may update the checkpoint in response to restoring the plurality of inode parts. Each of the plurality of inode parts may comprise at least a mapping to a corresponding individual file part of the multi-part file, which may be used during the retrieval and assembly process.

In some cases, the method 500 may repeat the restoring of inode parts, the retrieving, and the assembling for the second subset of the plurality of inode parts. This iterative process may continue until all parts of the multi-part file have been restored and assembled.

Figure 6:
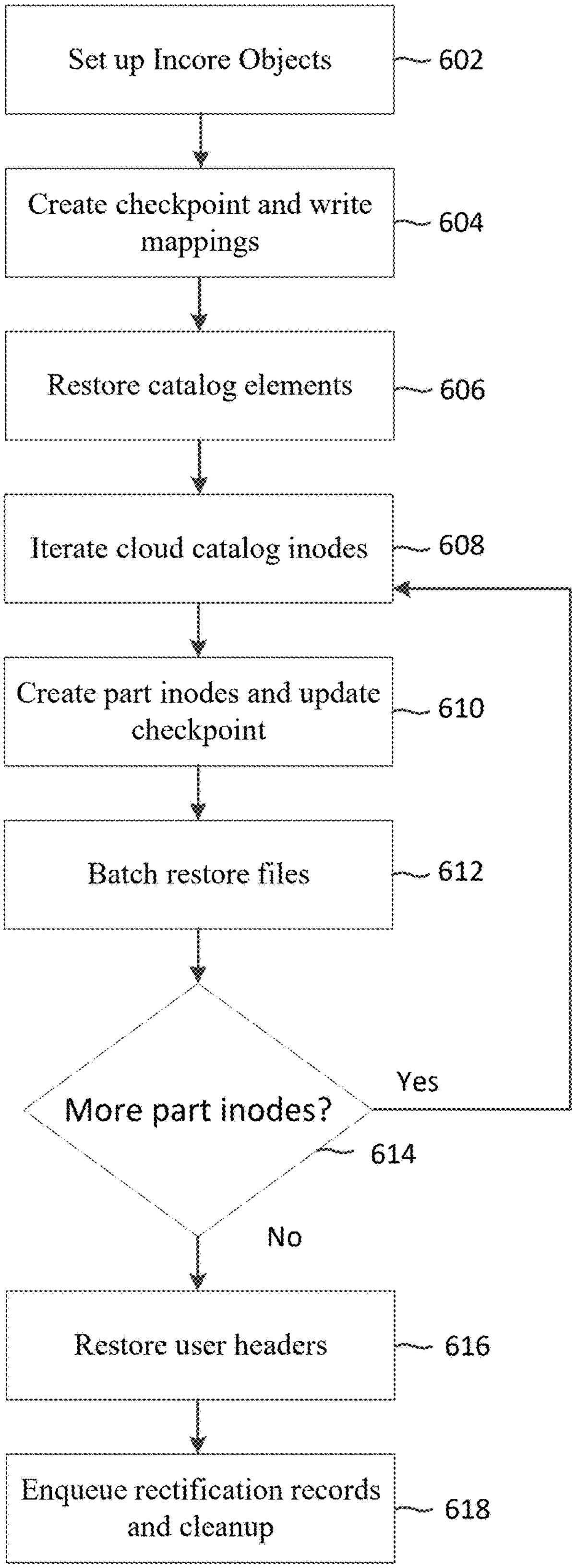
FIG. 6 illustrates a method for performing multi-part file restoration in accordance with one or more example embodiments.

FIG. 6 provides more detail with respect to the method 500 of FIG. 5. In particular, FIG. 6 illustrates a method 600 for implementing for performing multi-part file restoration in accordance with one or more example embodiments. The method 600 may be implemented by one or more processors executing computer-readable instructions (e.g., from one or more computer-readable media) to perform the functions described herein, e.g. by one or more cloud resources illustrated by FIGS. 1-5. It is understood that additional steps can be provided before, during, and after the steps of the method 600, and that some of the steps described can be replaced or eliminated for other embodiments of the method 600.

At block 602, incore objects are set up by the cloud system. These objects may be data structures used by the restore module 108 to manage the restoration process, such as a restore manager (e.g., restore manager 310), iterator (e.g., cloud iterator 314), etc. The incore objects may include various data structures for tracking file parts, inode mappings, and restoration progress.

The process continues to block 604, where the cloud system creates a checkpoint and mappings may be written. This checkpoint may correspond to the checkpoint created in block 504 of method 500. The checkpoint may be used to track the progress of the restoration process and may allow for efficient resumption of the process in case of interruptions. The cloud filehandlese for the part inodes may also be written.

At block 606, the cloud system may perform restoration of catalog elements. This may involve restoring catalog inodes associated with multi-part files. The catalog inodes may include metadata associated with a plurality of file parts, where the metadata may comprise a plurality of inode parts corresponding to individual file parts of the multi-part file. For example, catalog elements may include access control lists (ACLs), streams, and labels.

At block 608, the cloud system iterates through cloud catalog inodes. This iteration process may involve scanning through the catalog inodes to identify and process the associated part inodes.

At block 610, the cloud system creates part inodes and the checkpoint may be updated. The creation of part inodes may involve restoring inode parts of the catalog inode, as well as tying each part inode with the catalog inode (e.g., by. In some cases, the plurality of inode parts may comprise a first subset and a second subset. this includes creating part inodes for every cloud part inode and ties it with the catalog inode. Information that is checkpointed may include an array of source, destination filehandle mappings.

The process moves to block 612, where the cloud system performs batch restore operations on the files. This may involve retrieving file parts corresponding to the restored inode parts. In some cases, this may involve retrieving a subset of corresponding individual file parts corresponding to the restored subset of the plurality of inode parts. The retrieving of the subset of corresponding individual file parts may be performed as a parallel process, potentially utilizing multiple cloud iterator modules 316 to improve efficiency.

At decision block 614, the method 600 may determine if there are more part inodes to process. If there are more part inodes (Yes branch), the process may return to block 608 to continue iterating through cloud catalog inodes as described above and further below. This iterative process may continue until all parts of the multi-part file have been restored and assembled.

If there are no more part inodes to process (No branch), the method 600 may proceed to block 616, where user headers may be restored. This step may involve restoring any additional metadata or user-specific information associated with the multi-part files.

The method 600 may conclude at block 618 with enqueuing rectification records and performing cleanup operations. This final step may involve updating any remaining metadata, verifying the integrity of the restored files, and releasing any temporary resources used during the restoration process.

Throughout the method 600, the restore module 108 may update the checkpoint in response to restoring the plurality of inode parts and assembling file parts. Each of the plurality of inode parts may comprise at least a mapping to a corresponding individual file part of the multi-part file, which may be used during the retrieval and assembly process. The method 600 provides a detailed workflow for restoring multi-part files in a cloud storage system, incorporating checkpointing mechanisms for robustness and parallel processing capabilities for efficiency. This method may allow for the restoration of complex file structures while maintaining data integrity and providing mechanisms for handling interruptions or failures during the restoration process.

Directory Restore: In addition to working on individual multi-part files, aspects of the present disclosure also apply to directories with multiple such multi-part files. For example, FIG. 7 illustrates another implementation of a restoration system 700, which may provide similar functionality to the restoration system 300 but with additional elements to handle directories as well as individual multi-part files.

The restoration system 700 includes item workflows 702 and group workflow 704, which may be analogous to the item workflows 302 and group workflow 304 in FIG. 3. These components coordinate the overall restoration process for both files and directories. In addition, the restoration system 700 also includes a restore service module 708, analogous to the restore service module 308 described above; a restore manager module 710, analogous to restore manager module 310; a checkpoint module 712 analogous to checkpoint module 312; a restore orchestrator module 714 that is analogous to cloud orchestrator module 314; and cloud iterator modules 716, analogous to cloud iterator modules 316 of FIG. 3. These aspects are similar to the discussions above, operating in the same manner on multi-part files, with the addition of several other modules to also handle directories.

Figure 7:
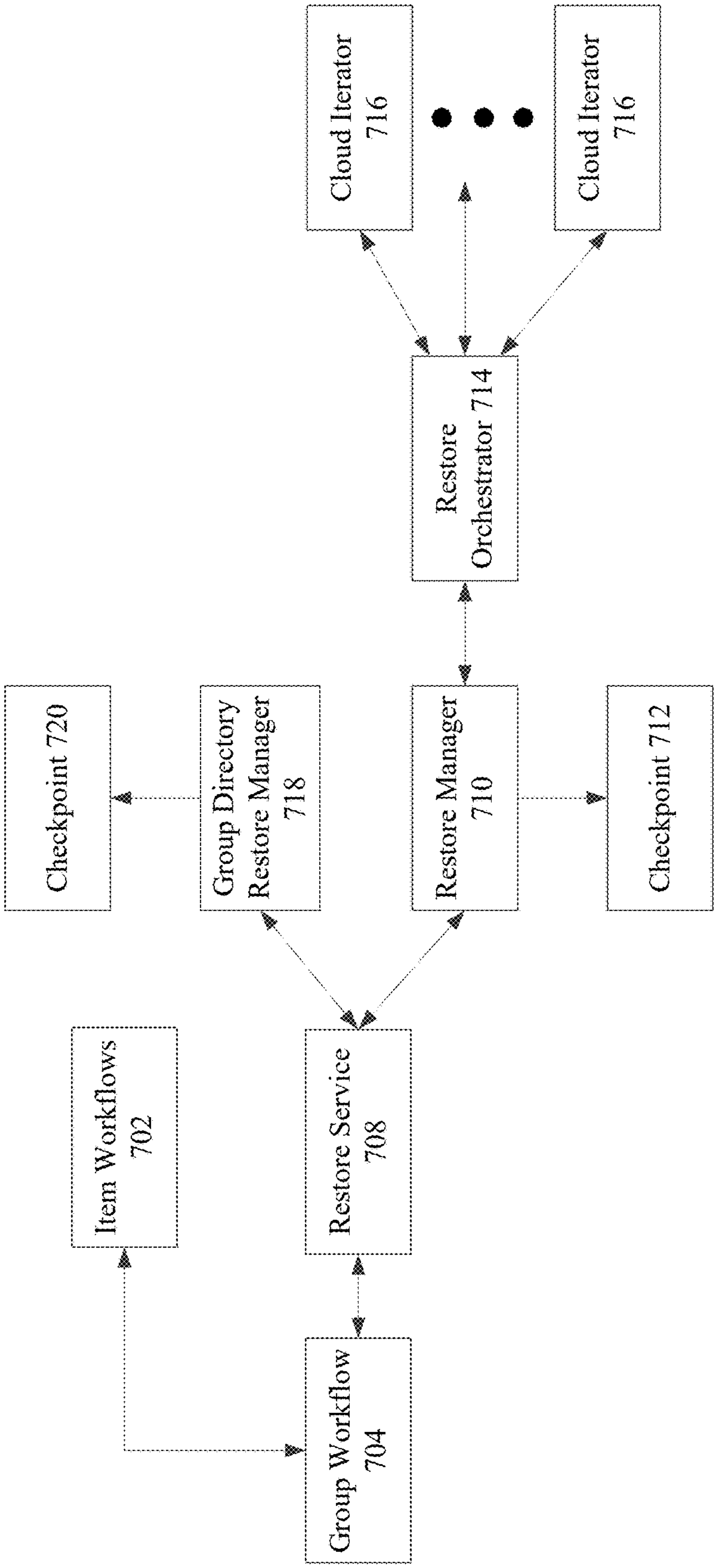
FIG. 7 is a schematic diagram illustrating relationships between cloud computing elements for managing directory restoration processes with a directory that includes multi-part files, in accordance with one or more example embodiments.

For example, FIG. 7's restoration system 700 also includes group directory restore manager 718 and associated checkpoint 720. The group directory restore manager 718 handles directory-specific restoration tasks. This module works in conjunction with its own checkpoint module 720 to track directory restoration progress, allowing for more granular control and recovery options for directory-level operations. For example, directory-specific restoration checkpointing may be implemented as a depth-first implementation (e.g., stack), while a multi-part file checkpoint may be implemented as though it is a flat directory infrastructure (e.g., without nested directories, where the on-disk format of the checkpoint with one directory for all the files/directories instead of a directory within another directory, etc.).

In addition to the processes discussed above with respect to FIG. 3's architecture, the group directory restore manager 718 may, while scanning a current directory for a next batch of inodes, insert the entry in a common checkpoint data file for a catalog inode section if the current inode returned by the iterator is a multi-part file. Further, the catalog inodes and regular files (e.g., non-multi-part files) may be transferred according to their regular workflows as well.

Further, when all the part-inodes of a particular catalog inode(s) in a current batch are transferred, the group directory resource manager 718 may checkpoint the completion of the current batch of files and clean up the catalog-inode section and update an index to a top-level entry in the stack. The group directory resource manager 718 may then connect with a group cloud directory iterator (e.g., cloud iterator 716) to start scanning the next batch of files.

This enhanced architecture enables the system to handle complex scenarios involving multiple multi-part files within directory structures, while maintaining the ability to perform efficient single-file restorations. The addition of directory-specific components allows for more comprehensive and flexible restoration capabilities in cloud storage environments.

Figure 8:
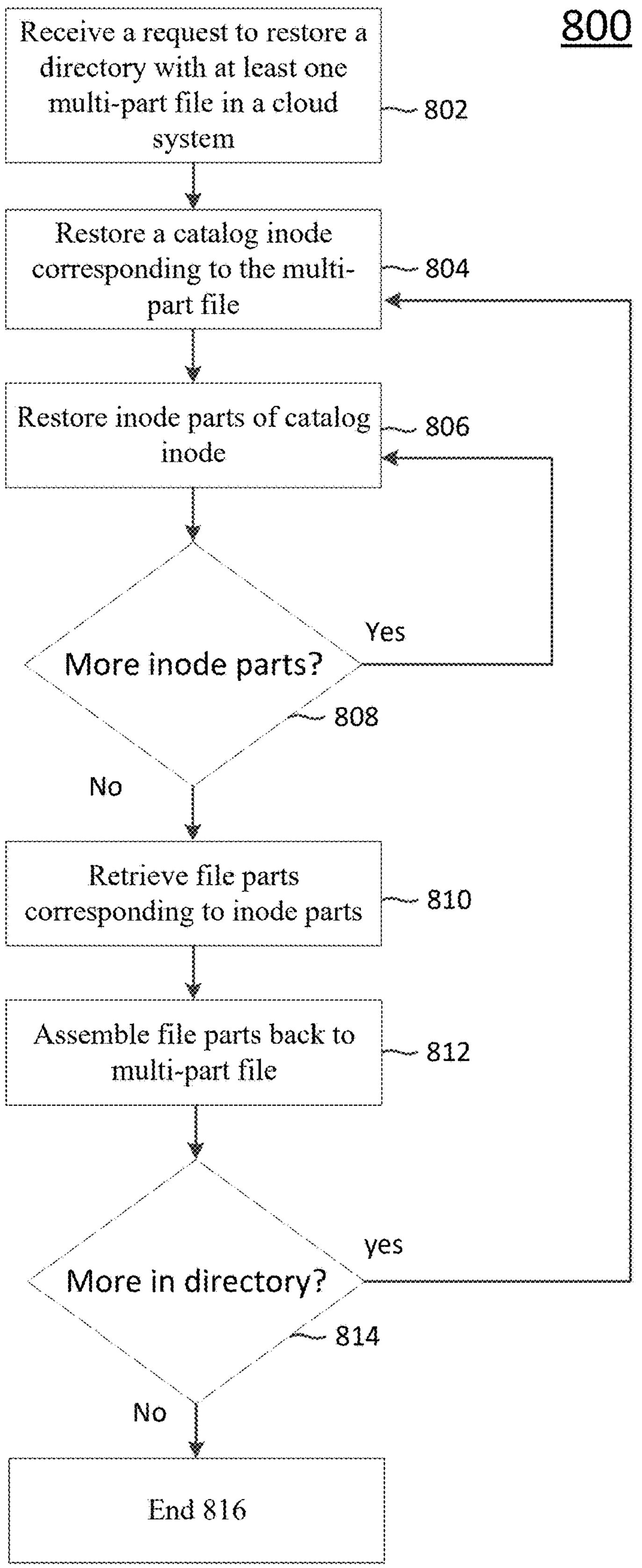
FIG. 8 illustrates a method for performing directory restoration with a directory with a multi-part file in accordance with one or more example embodiments.

FIG. 8 illustrates a method 800 for performing directory restoration with a directory with a multi-part file in accordance with one or more example embodiments. The method 800 may be implemented by one or more processors executing computer-readable instructions (e.g., from one or more computer-readable media) to perform the functions described herein, e.g. by one or more cloud resources illustrated by FIGS. 1-7. It is understood that additional steps can be provided before, during, and after the steps of the method 800, and that some of the steps described can be replaced or eliminated for other embodiments of the method 800.

At block 802, the method 800 begins with the cloud system receiving a request to restore a directory with at least one multi-part file. This request may be initiated by a customer 104 or 105 through the interface 110 of the storage platform 102.

At block 804, the cloud system proceeds to restore a catalog inode corresponding to the multi-part file. This may involve the restore module 108 interacting with the cloud system 106 to retrieve the catalog inode 204 associated with the multi-part file. The catalog inode 204 may include metadata associated with a plurality of file parts, where the metadata may comprise a plurality of inode parts corresponding to individual file parts of the multi-part file.

At block 806, the cloud system restores inode parts of the catalog inode. This process may be similar to the restoration of inode parts described in method 500 (FIG. 5) and method 600 (FIG. 6). The restore manager module 310 or 710 may coordinate with the restore orchestrator module 314 or 714 to retrieve and restore these inode parts.

At decision block 808, the cloud system determines if there are more inode parts to restore. This decision may be based on information stored in the checkpoint module 312 or 712. If there are more inode parts (Yes branch), the method 800 returns to block 806 to continue restoring inode parts. This iterative process may involve multiple cloud iterator modules 316 or 716 working in parallel to improve efficiency.

If there are no more inode parts to restore (No branch), the method 800 proceeds to block 810. At block 810, the cloud system retrieves file parts corresponding to the restored inode parts. This step may involve the cloud iterator modules 316 or 716 fetching the actual file data from various cloud resources 118, 120, or 122.

The method 800 then proceeds to block 812, where cloud system assembles the retrieved file parts back into the multi-part file. This assembly process may be coordinated by the restore manager module 310 or 710, utilizing the metadata from the catalog inode 204 and the restored inode parts to correctly reconstruct the file.

At decision block 814, the cloud system determines if there are more files in the directory to restore. This decision may be managed by the group directory restore manager 718, which tracks the progress of directory restoration. If there are more files (Yes branch), the method 800 returns to block 804 to process the next file. This loop ensures that all files within the directory, including both multi-part and regular files, are restored.

If there are no more files to restore (No branch), the method 800 proceeds to block 816 where it ends. At this point, the entire directory, including all multi-part files, has been restored. Throughout this process, the method 800 may utilize checkpointing mechanisms, such as those managed by checkpoint modules 312, 712, and 720, to track progress and enable recovery in case of interruptions. The group workflow 304 or 704 may coordinate the overall restoration process, while item workflows 302 or 702 handle specific restoration tasks for individual files or components. This method 800 leverages the enhanced architecture of the restoration system 700 to handle complex scenarios involving multiple multi-part files within directory structures. It combines the file-level restoration capabilities described in earlier methods with directory-specific handling, allowing for efficient and comprehensive restoration of entire directory structures in cloud storage environments.

Figure 9:
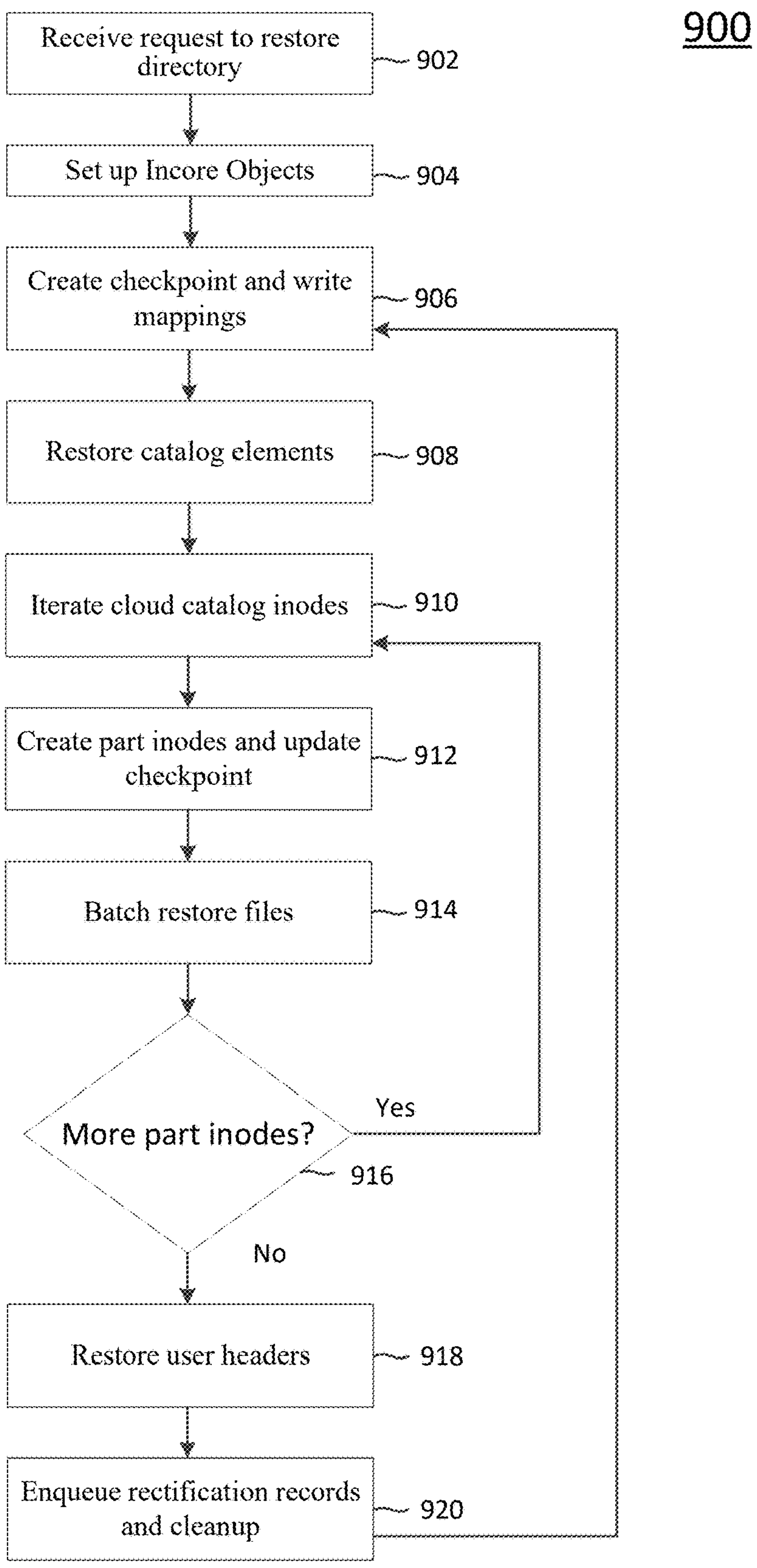
FIG. 9 illustrates a method for performing directory restoration with a directory with a multi-part file in accordance with one or more example embodiments.

FIG. 9 illustrates a method 900 for performing directory restoration with a directory with a multi-part file in accordance with one or more example embodiments. The method 900 may be implemented by one or more processors executing computer-readable instructions (e.g., from one or more computer-readable media) to perform the functions described herein, e.g. by one or more cloud resources illustrated by FIGS. 1-8. It is understood that additional steps can be provided before, during, and after the steps of the method 900, and that some of the steps described can be replaced or eliminated for other embodiments of the method 900.

At block 902, the cloud system receives a request to restore a directory. This request may be initiated by a customer 104 or 105 through the interface 110 of the storage platform 102. The directory may comprise multiple database parts including at least one catalog inode associated with a multi-part file.

At block 904, the cloud system sets up incore objects needed for the restoration process. This may involve initializing data structures and preparing the system for the upcoming restoration tasks. These objects may be data structures used by the restore module 108 to manage the restoration process.

The method 900 proceeds to block 906, where the cloud system creates a checkpoint and mappings are written. This may involve creating an initial checkpoint using the checkpoint module 312 or 712 to track the progress of the restoration process. The mappings may include an array of source and destination file handle pairs for catalog inodes.

At block 908, the cloud system restores catalog elements. This may include restoring catalog inodes' ACLs, streams, and labels. The restore manager module 310 or 710 may coordinate with the restore orchestrator module 314 or 714 to retrieve and restore these elements.

At block 910, the cloud system iterates through cloud catalog inodes. This process may involve the group directory restore manager 718 scanning the current directory for the next batch of inodes.

At block 912, the cloud system creates part inodes and the checkpoint is updated accordingly. For each cloud part inode, part inodes may be created and associated with the corresponding catalog inode. The checkpoint may be updated with part inode mappings to track progress.

At block 914, the cloud system restores files in batches. This may involve retrieving file parts corresponding to the restored inode parts from various cloud resources 118, 120, or 122. The retrieval process may be performed in parallel using multiple cloud iterator modules 316 or 716 to improve efficiency.

At decision block 916, the cloud system determines if there are more part inodes to process. If there are more part inodes (Yes branch), the method 900 returns to block 910 to continue iterating through cloud catalog inodes. This iterative process may continue until all parts of the multi-part files in the directory have been restored as discussed above and further below.

If there are no more part inodes to process (No branch), the method 900 proceeds to block 918, where the cloud system restores user headers. This may involve restoring any additional metadata or user-specific information associated with the multi-part files in the directory.

Finally, at block 920, the cloud system enqueues rectification records and performs cleanup operations. This may involve updating any remaining metadata, verifying the integrity of the restored files and directory structure, and releasing any temporary resources used during the restoration process. After block 920, the method 900 may return to block 906 to continue processing any remaining elements in the directory. This loop ensures that all files and subdirectories within the main directory are fully restored. Throughout the method 900, checkpointing mechanisms may be utilized to track progress and enable recovery in case of interruptions. The group workflow 704 may coordinate the overall restoration process, while item workflows 702 handle specific restoration tasks for individual files or components. The method 900 leverages the enhanced architecture of the restoration system 700 to handle complex scenarios involving multiple multi-part files within directory structures. It combines file-level restoration capabilities with directory-specific handling, allowing for efficient and comprehensive restoration of entire directory structures in cloud storage environments.

By following these methods, the restore module 108 may efficiently restore entire directories containing multi-part files of various sizes and structures within the cloud provider environment 100. The use of checkpoints, parallel processing, and iterative restoration of file parts and directories may allow for robust and scalable restoration of complex directory structures in cloud storage systems that employ granular data distribution. The restoration system for multi-part files and directories in a cloud storage system may integrate various components to provide efficient and reliable data recovery. The system may utilize a combination of hardware and software elements to manage the complex process of restoring distributed file parts across cloud resources. In some cases, the restoration process may begin when a user initiates a request through the interface of the storage platform. This request may be processed by the restore module, which may coordinate with other components of the cloud system to locate and retrieve the necessary file parts. During the restoration process, the system may restore the catalog inode associated with a multi-part file. The catalog inode may include metadata associated with a plurality of file parts, where the metadata may comprise a plurality of inode parts corresponding to individual file parts of the multi-part file.

By integrating these various components and processes, the restoration system may provide a robust solution for recovering multi-part files and directories in cloud storage environments that employ granular data distribution. The system's ability to handle complex file structures, leverage parallel processing, and maintain progress through checkpointing may contribute to efficient and reliable data restoration in cloud-based storage systems. A number of implementations have been described. Nevertheless, it will be understood that various modifications may be made without departing from the spirit and scope of the disclosure. Accordingly, other implementations are within the scope of the following claims.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for restoring a directory in a cloud storage system, comprising:

receiving, by a processor, a request to restore the directory, wherein the directory comprises a plurality of parts including at least one catalog portion that is associated with a multi-part data container that comprises a plurality of data container parts, the catalog portion including metadata associated with the plurality of data container parts and the metadata comprising a plurality of metadata structure parts corresponding to individual data container parts of the multi-part data container;

restoring, by the processor, the catalog portion at a new volume location of the cloud storage system;

restoring, iteratively by the processor based on the metadata of the catalog portion from the cloud storage system, the plurality of metadata structure parts in the restored catalog portion;

retrieving, by the processor based on the restored plurality of metadata structure parts, the corresponding individual data container parts from their respective storage resources of the cloud storage system;

assembling, by the processor based on the catalog portion and plurality of metadata structure parts, the retrieved corresponding individual data container parts to reconstruct the multi-part data container; and repeating, by the processor based on the plurality of parts in the directory, the catalog portion restoration, the metadata structure parts restoration, individual data container parts retrieval, and data container parts assembling for one or more additional catalog portion within the directory.

2. The method of claim 1, wherein the plurality of parts further includes at least one additional directory, the method further comprising repeating the catalog portion restoration, the metadata structure parts restoration, individual data container parts retrieval, and data container parts assembling for each catalog portion of the at least one additional directory.

3. The method of claim 1, further comprising:

creating, by the processor in response to restoring the catalog portion, a checkpoint for the catalog portion; and updating, by the processor in response to restoring the plurality of metadata structure parts, the checkpoint, wherein the plurality of metadata structure parts each comprises at least a mapping to a corresponding individual data container part of the multi-part data container.

4. The method of claim 1, wherein:

the plurality of metadata structure parts comprises a first subset and a second subset, the restoring of the plurality of metadata structure parts comprises restoring the first subset of the plurality of metadata structure parts, the retrieving comprises retrieving a third subset of corresponding individual data container parts corresponding to the first subset of the plurality of metadata structure parts, and the assembling comprises assembling the retrieved third subset of corresponding individual data container parts to reconstruct a first portion of the multi-part data container.

5. The method of claim 4, further comprising:

repeating the restoring of metadata structure parts, the retrieving, and the assembling for the second subset of the plurality of metadata structure parts.

6. The method of claim 4, wherein the retrieving of the third subset of corresponding individual data container parts is performed as a parallel process.

7. The method of claim 1, further comprising:

retrieving, by the processor based on the request to restore the directory, one or more non-multi-part data containers prior to performing each operation for each catalog portion.

8. An apparatus for restoring a directory in a cloud storage system, comprising:

a processor; and a memory storing instructions that, when executed by the processor, cause the apparatus to:

receive a request to restore the directory, wherein the directory comprises a plurality of database parts including at least one catalog portion that is associated with a multi-part data container that comprises a plurality of data container parts, the catalog portion including metadata associated with the plurality of data container parts and the metadata comprising a plurality of metadata structure parts corresponding to individual data container parts of the multi-part data container;

populate a checkpoint metafile with the at least one catalog portion;

restore the catalog portion at a new volume location of the cloud storage system;

restore, iteratively based on the metadata of the catalog portion from the cloud storage system, the plurality of metadata structure parts in the restored catalog portion;

retrieve, based on the restored plurality of metadata structure parts, the corresponding individual data container parts from their respective storage resources of the cloud storage system; and assemble, based on the catalog portion and plurality of metadata structure parts, the retrieved corresponding individual data container parts to reconstruct the multi-part data container.

9. The apparatus of claim 8, wherein the plurality of parts further includes at least one additional directory, and wherein the instructions, when executed by the processor, further cause the apparatus to repeat the populating, restoring the catalog portion, restoring the plurality of metadata structure parts, the retrieval, and the assembling for each catalog portion of the at least one additional directory.

10. The apparatus of claim 8, wherein the instructions, when executed by the processor, further cause the apparatus to:

create, in response to restoring the catalog portion, a checkpoint for the catalog portion; and update, in response to restoring the plurality of metadata structure parts, the checkpoint, wherein the plurality of metadata structure parts each comprises at least a mapping to a corresponding individual data container part of the multi-part data container.

11. The apparatus of claim 9, wherein:

the plurality of metadata structure parts comprises a first subset and a second subset, the restoring of the plurality of metadata structure parts comprises restoring the first subset of the plurality of metadata structure parts, the retrieving comprises retrieving a third subset of corresponding individual data container parts corresponding to the first subset of the plurality of metadata structure parts, and the assembling comprises assembling the retrieved third subset of corresponding individual data container parts to reconstruct a first portion of the multi-part data container.

12. The apparatus of claim 11, wherein the instructions, when executed by the processor, further cause the apparatus to:

repeat the restoring of metadata structure parts, the retrieving, and the assembling for the second subset of the plurality of metadata structure parts.

13. The apparatus of claim 11, wherein the retrieving of the third subset of corresponding individual data container parts is performed as a parallel process.

14. The apparatus of claim 9, wherein the instructions, when executed by the processor, further cause the apparatus to:

retrieve, based on the request to restore the directory, one or more non-multi-part data containers prior to performing each operation for each catalog portion.

15. A non-transitory machine-readable medium having stored thereon instructions for performing a method comprising machine-executable code which, when executed by at least one machine of a cloud storage system, causes the at least one machine to:

receive a request to restore a directory, wherein the directory comprises a plurality of parts including at least one regular data container and at least one catalog portion that is associated with a multi-part data container that comprises a plurality of data container parts, the catalog portion including metadata associated with the plurality of data container parts and the metadata comprising a plurality of metadata structure parts corresponding to individual data container parts of the multi-part data container;

restore each regular data container of the directory and each catalog portion at a new volume location of the cloud storage system;

perform, for each catalog portion:

restore, iteratively based on the metadata of the catalog portion from the cloud storage system, the plurality of metadata structure parts in the restored catalog portion;

retrieve, based on the restored plurality of metadata structure parts, the corresponding individual data container parts from their respective storage resources of the cloud storage system; and assemble, based on the catalog portion and plurality of metadata structure parts, the retrieved corresponding individual data container parts to reconstruct the multi-part data container.

16. The non-transitory machine-readable medium of claim 15, wherein the code when executed further causes the at least one machine to:

create, in response to restoring at least one regular data container and the at least one catalog portion, a check-point; and update, in response to restoring the plurality of metadata structure parts, the checkpoint, wherein the plurality of metadata structure parts each comprises at least a mapping to a corresponding individual data container part of the multi-part data container.

17. The non-transitory machine-readable medium of claim 15, wherein:

the plurality of metadata structure parts comprises a first subset and a second subset, the restoring of the plurality of metadata structure parts comprises restoring the first subset of the plurality of metadata structure parts, the retrieving comprises retrieving a third subset of corresponding individual data container parts corresponding to the first subset of the plurality of metadata structure parts, the assembling comprises assembling the retrieved third subset of corresponding individual data container parts to reconstruct a first portion of the multi-part data container, and the retrieving of the third subset of corresponding individual data container parts is performed as a parallel process.

18. The non-transitory machine-readable medium of claim 17, wherein:

the first subset comprises a first batch of metadata structure parts and the second subset comprises a second batch of metadata structure parts, and the parallel process is performed by corresponding cloud iterator modules implemented by the at least one machine.

19. The non-transitory machine-readable medium of claim 15, wherein the plurality of parts further includes at least one additional directory, and wherein the code, when executed further cause the at least one machine to repeat the performing for each catalog portion of the at least one additional directory.

20. The non-transitory machine-readable medium of claim 15, wherein the catalog portion comprises at least one of an access control list, a stream, and a label.

* * * * *